(12) United States Patent
Kaji et al.

(10) Patent No.: US 11,134,232 B2
(45) Date of Patent: Sep. 28, 2021

(54) INFORMATION PROCESSING APPARATUS, INFORMATION PROCESSING METHOD, AND PROGRAM

(71) Applicant: SONY CORPORATION, Tokyo (JP)

(72) Inventors: Yohsuke Kaji, Chiba (JP); Naomasa Takahashi, Chiba (JP); Tetsuo Ikeda, Tokyo (JP); Tadayoshi Murakami, Kanagawa (JP); Kae Nagano, Tokyo (JP); Eisuke Fujinawa, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/976,691

(22) PCT Filed: Feb. 20, 2019

(86) PCT No.: PCT/JP2019/006201
§ 371 (c)(1),
(2) Date: Aug. 28, 2020

(87) PCT Pub. No.: WO2019/171942
PCT Pub. Date: Sep. 12, 2019

(65) Prior Publication Data
US 2021/0051303 A1    Feb. 18, 2021

(30) Foreign Application Priority Data
Mar. 6, 2018 (JP) .............................. JP2018-039312

(51) Int. Cl.
*H04N 9/31* (2006.01)

(52) U.S. Cl.
CPC ......... *H04N 9/3179* (2013.01); *H04N 9/3147* (2013.01)

(58) Field of Classification Search
CPC .. H04N 9/3147; H04N 9/3185; H04N 9/3179; H04N 9/3182; H04N 9/31;
(Continued)

(56) References Cited

U.S. PATENT DOCUMENTS

| 6,760,075 B2* | 7/2004 | Mayer, III | H04N 9/12 348/745 |
| 7,936,361 B2* | 5/2011 | Aufranc | G03B 21/26 345/640 |
| 2017/0064294 A1 | 3/2017 | Priede | |

FOREIGN PATENT DOCUMENTS

| JP | 2011-257609 A | 12/2011 |
| JP | 2016-085380 A | 5/2016 |
| JP | 2017-050689 A | 3/2017 |

OTHER PUBLICATIONS

Momoyo Nagase et al., Dynamic defocus occlusion compensation of projected imagery by model-based optimal projector selection in multi-projection environment, Virtual Reality (2011), Aug. 18, 2010, pp. 119-132, Springer-Verlag London Limited.
(Continued)

*Primary Examiner* — Sherrie Hsia
(74) *Attorney, Agent, or Firm* — Paratus Law Group, PLLC

(57) ABSTRACT

There is provided an information processing apparatus, an information processing method, and a program capable of reducing a decrease in resolution in overlapping areas of multiple projection in cases where a plurality of projectors is used to perform the multiple projection onto an object. An information processing apparatus according to one aspect of the present technology generates, in regard to a plurality of projectors irradiating an object serving as a projection target with projection light rays as superimposing light rays depicting a projection image having pixels, mask information for regulating intensity of the corresponding light ray of each pixel of the projection image. The mask information includes information indicating, in regard to the object having a surface including a predetermined position, that the position is irradiated by a predetermined projector. The
(Continued)

present technology can be applied to computers each of which causes a plurality of projectors to project images.

13 Claims, 13 Drawing Sheets

(58) Field of Classification Search
CPC .... G03B 21/00; G03B 21/2033; G03B 27/72; G03B 35/20
USPC .......................... 348/744–747, 739, 806, 807
See application file for complete search history.

(56) References Cited

OTHER PUBLICATIONS

Momoyo Nagase et al., Dynamic Control of Multiple Focal-Plane Projections for Eliminating Defocus and Occlusion, 2010 IEEE Virtual Reality Conference (VR), Mar. 20-24, 2010, pp. 293-294, IEEE, Waltham, Massachusetts, USA.

\* cited by examiner

FIG.8
A
DEPTH INFORMATION OF PROJECTOR #0
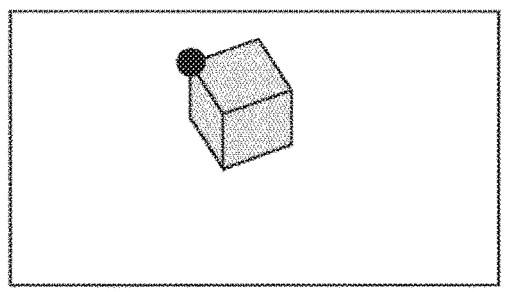
$P_0$ (BASED ON PROJECTOR #0)
$P_0'$ (BASED ON PROJECTOR #1)
B
DEPTH INFORMATION OF PROJECTOR #1
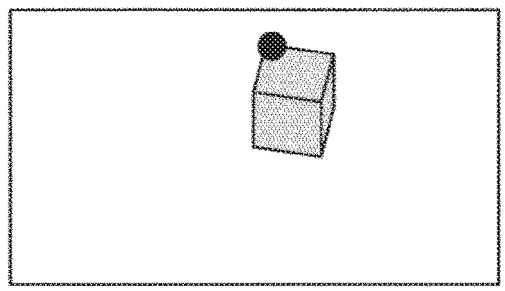
$P_1$ (BASED ON PROJECTOR #1)

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2019/006201 (filed on Feb. 20, 2019) under 35 U.S.C. § 371, which claims priority to Japanese Patent Application No. 2018-039312 (filed on Mar. 6, 2018), which are all hereby incorporated by reference in their entirety.

TECHNICAL FIELD

The present technology relates to an information processing apparatus, an information processing method, and a program, and particularly to an information processing apparatus, an information processing method, and a program capable of reducing a decrease in resolution in an overlapping area of multiple projection in cases where a plurality of projectors is used to perform the multiple projection onto an object.

BACKGROUND ART

A technology of PM (Projection Mapping) is known which causes a plurality of projectors to work together to project an image on an object.

A state in which light rays from a plurality of projectors overlap with one another on an object is called overlap. For example, in cases where two projectors are used, an area where a projection region of one of the projectors overlaps with a projection region of the other is defined as an overlapping area.

CITATION LIST

Patent Literature

[PTL 1]
JP 2011-257609A

SUMMARY

Technical Problems

If it is possible to correctly estimate internal parameters (focal length, principal point, and lens distortion) of each projector and a relation between relative postures of each projector and an object, it allows images to be projected without any projection deviation even in an overlapping area.

Such projection, however, is difficult to perform under practical circumstances, so that an inevitable projection deviation may occur due to subtle errors. As a result, a decrease in resolution occurs in overlapping areas, leading also to deteriorated quality of PM.

The present technology has been made in view of such a situation, and is capable of reducing a decrease in resolution in overlapping areas in cases where multiple projection is performed on an object with a plurality of projectors.

Solution to Problems

An information processing apparatus according to one aspect of the present technology includes a generation unit configured to generate, in regard to a plurality of projectors configured to irradiate an object serving as a projection target with projection light rays as superimposing light rays depicting a projection image having pixels, mask information used for regulating an intensity of the corresponding light ray of each pixel of the projection image. The mask information includes information indicating, in regard to the object having a surface including a predetermined position, that the predetermined position is irradiated by a predetermined projector of the projectors.

An information processing apparatus according to another aspect of the present technology includes a projection processing unit configured to regulate, in regard to a plurality of projectors configured to irradiate an object serving as a projection target with projection light rays as superimposing light rays depicting a projection image having pixels, an intensity of the corresponding light ray of each pixel of the projection image of each of the projectors, on the basis of mask information generated including information that indicates, in regard to the object having a surface including a predetermined position, that the predetermined position is irradiated by a predetermined projector of the projectors, and cause each of the projectors to project the projection image.

In one aspect of the present technology, mask information is generated, in regard to a plurality of projectors configured to irradiate an object serving as a projection target with projection light rays as superimposing light rays depicting a projection image having pixels, with the mask information being used for regulating an intensity of the corresponding light ray of each pixel of the projection image. The mask information includes information indicating, in regard to the object having a surface including a predetermined position, that the predetermined position is irradiated by a predetermined projector of the projectors.

In another aspect of the present technology, in regard to a plurality of projectors configured to irradiate an object serving as a projection target with projection light rays as superimposing light rays depicting a projection image having pixels, processing is executed which includes regulating an intensity of the corresponding light ray of each pixel of the projection image of each of the projectors, on the basis of mask information generated including information that indicates, in regard to the object having a surface including a predetermined position, that the predetermined position is irradiated by a predetermined projector of the projectors, and causing each of the projectors to project the projection image.

Advantageous Effect of Invention

According to the present technology, it is possible to reduce a decrease in resolution in overlapping areas in cases where a plurality of projectors performs multiple projection onto an object.

Note that the effect described herein is not necessarily limited, and may be any effects described in the present disclosure.

BRIEF DESCRIPTION OF DRAWINGS

FIG. 8 depicts diagrams illustrating an example of depth information.

DESCRIPTION OF EMBODIMENT

Hereinafter, a mode for carrying out the present invention will be described. Note that the description will be made in the following order.

1. Configuration of Projection System
2. Configuration of Control Apparatus
3. Operation of Control Apparatus
4. Modifications <Configuration of Projection System>

Figure 1:
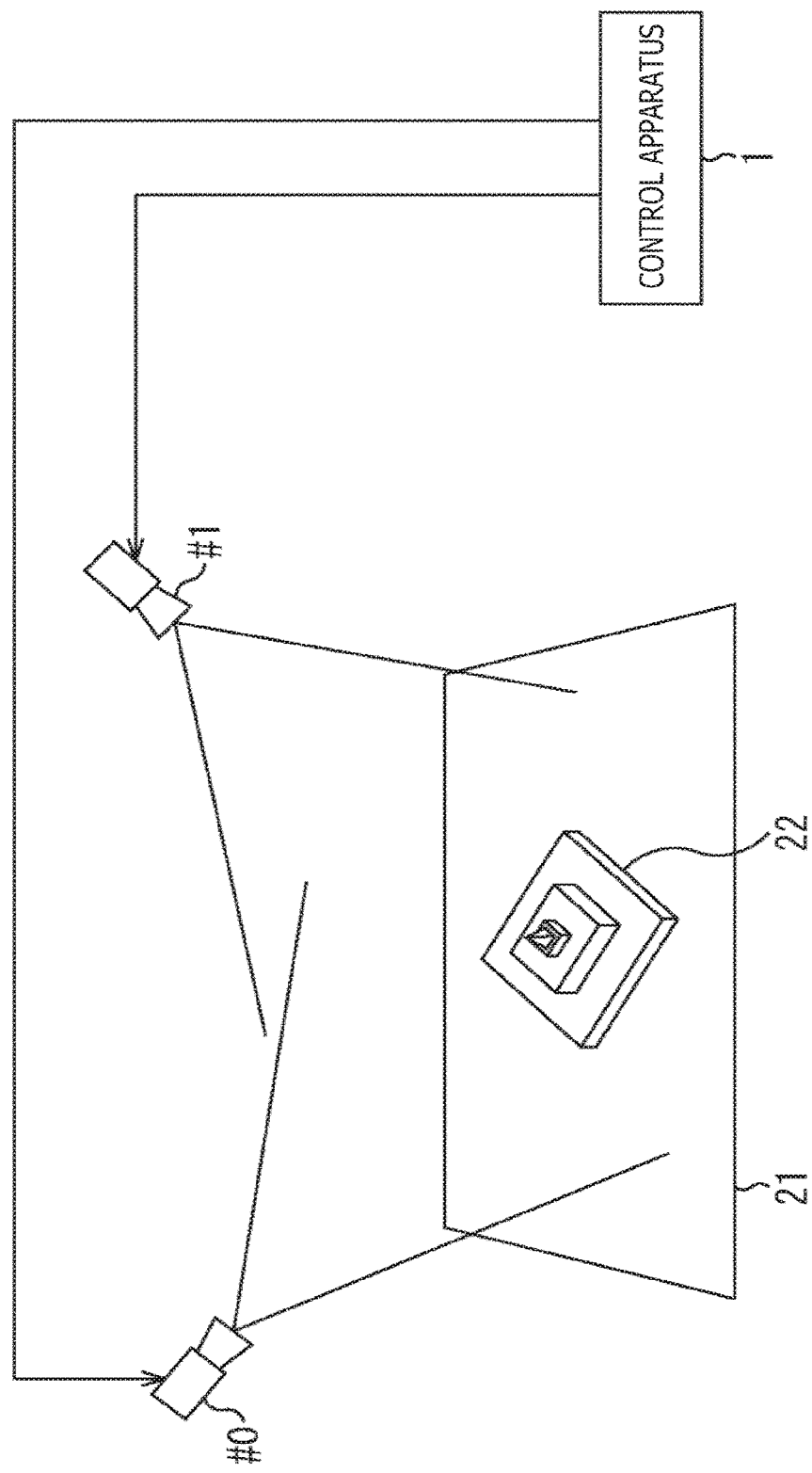
FIG. 1 depicts a diagram illustrating an example of a configuration of a projection system according to an embodiment of the present technology.

FIG. 1 depicts a diagram illustrating an example of a configuration of a projection system according to an embodiment of the present technology.

The projection system of FIG. 1 is configured such that a projector #0 and a projector #1 are coupled to a control apparatus 1 via wired or wireless communication. The projectors #0 and #1 are disposed above a projection space such that their projection directions face an object 22. The setting positions of the projectors #0 and #1 may be not necessarily limited to the positions above the projection space.

The control apparatus 1 includes an apparatus such as a personal computer, a smartphone, and a tablet terminal. The control apparatus 1 controls the projection of images performed by the projectors #0 and #1.

Under the control by the control apparatus 1, the projectors #0 and #1 emit projection light that represents predetermined images.

With the projection system depicted in FIG. 1, the projectors #0 and #1 are used to project images onto an object 22 that is placed on a floor surface 21. The image represented by the projection light emitted by the projector #0 is projected mainly on the left side of the object 22, and the image represented by the projection light emitted by the projector #1 is projected mainly on the right side of the object 22.

Onto the object 22, for example, a texture image is projected for expressing texture of the surface of the object 22, i.e., a texture of such as metal or wood. The projection of images is not limited to the expression of textures, but may be performed to present various kinds of information and produce stereophonic effects.

Although the description will be made mainly regarding cases where two projectors are used to project images, the number of the projectors is not limited to two, and more projectors may be disposed.

As described above, the projection system depicted in FIG. 1 is a PM (Projection Mapping) system that is intended to project an image on the entire surface of an object 22 in a manner as follows: For an area on which one projector cannot project an image, another projector projects the image on the area.

Figure 2:
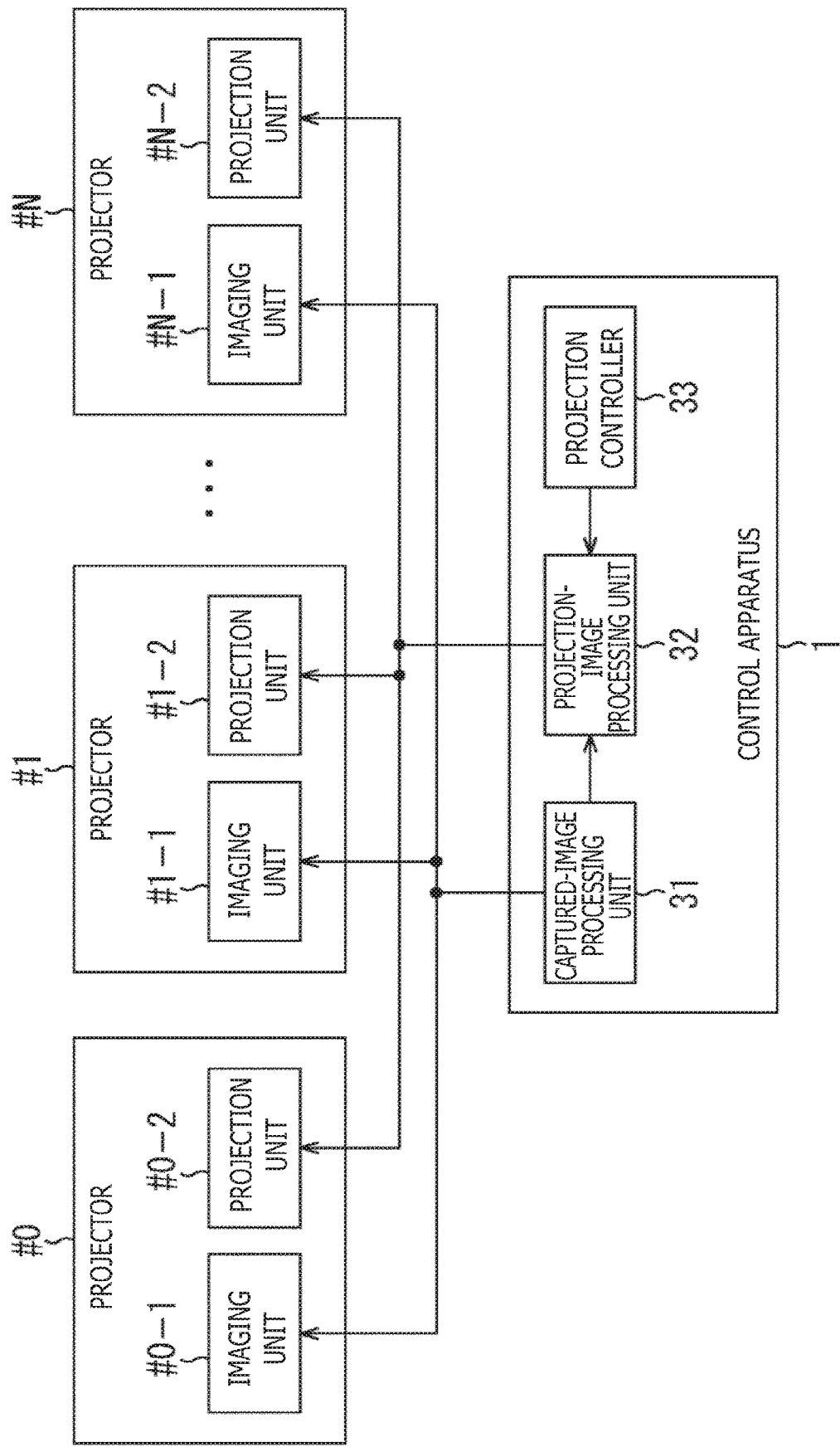
FIG. 2 depicts a block diagram illustrating an example of the configuration of the projection system.

FIG. 2 is a block diagram illustrating an example of a configuration of the projection system.

In the example depicted in FIG. 2, projectors other than the projectors #0 and #1 are also illustrated. Each of the projectors #0 to #N includes an imaging unit including a camera, and a projection unit including a display device, a lens, and a light source.

For example, the imaging unit #0-1 of the projector #0 captures a situation of the projection space that embraces the object 22. The image captured with the imaging unit #0-1 is used for, such as, correction of projection images performed by the control apparatus 1.

The projection unit #0-2 projects a projection image assigned to the projection unit #0-2, in accordance with the control by the control apparatus 1.

Each of the imaging units #1-1 to #N-1 of the projectors #1 to #N captures a situation of the corresponding projection space. Each of the projection units #1-2 to #N-2 as well projects a projection image assigned to the corresponding projection unit itself.

In the example of FIG. 2, although the number of the projection units and the number of the imaging units are equal, the numbers of them may be different. Moreover, instead of being incorporated in the projector, the imaging unit may be disposed at a location separated from the projector. The configuration of the control apparatus 1 may be disposed in the projector.

With the projection system depicted in FIG. 1, the intensity of the projection light (light ray) of each projector is regulated in order to prevent projection deviation in an overlapping area.

<Configuration of Control Apparatus>

As depicted in FIG. 2, the control apparatus 1 includes a captured-image processing unit 31, a projection-image processing unit 32, and a projection controller 33.

The captured-image processing unit 31 estimates, such as, a relation between relative postures of the projectors and the object 22, on the basis of the images captured by the imaging units of the projectors. Information that indicates the relation of postures estimated by the captured-image processing unit 31 is supplied to the projection-image processing unit 32.

The projection-image processing unit 32 generates a projection image for each of the projectors. The projection image is to be projected by the projector onto the object 22 serving as a projection target. The projection-image processing unit 32 subjects, as deemed appropriate, the projection image to various types of image processing, such as geometric correction and luminance correction, on the basis of the relation between the relative postures of the projector and the object 22 estimated by the captured-image processing unit 31. The projection-image processing unit 32 outputs, to the projector, the thus-generated projection image, which has been subjected to the various types of image processing, and causes the projector to project the projection image onto the object 22.

Moreover, the projection-image processing unit 32 regulates the intensity of projection light of each of pixels that constitute the projection image, on the basis of a projection mask that has been generated by the projection controller 33. The projection mask is information including a mask value for each pixel of the projection image. The mask value represents the intensity (gain) of the projection light. Such a projection mask is prepared for each projector.

The projection controller 33 generates the projection mask for each projector, and outputs the projection mask to the projection-image processing unit 32.

To the projection controller 33, internal parameters (focal length, principal point, and lens distortion) of each projector, external parameters of each projector, external parameters of an object serving as a projection target, and 3D model data of the object of the projection target are input. On the basis of both the external parameters of each projector and the external parameters of the object of the projection target, a relation between relative postures of each projector and the object of the projection target is estimated.

The generation of the projection mask by the projection controller 33 is performed by software, in response to the input of these pieces of information carried out by a user of the control apparatus 1, for example. Processing of, such as, ray detection described later for generating the projection mask is also performed by calculation by software.

Figure 3:
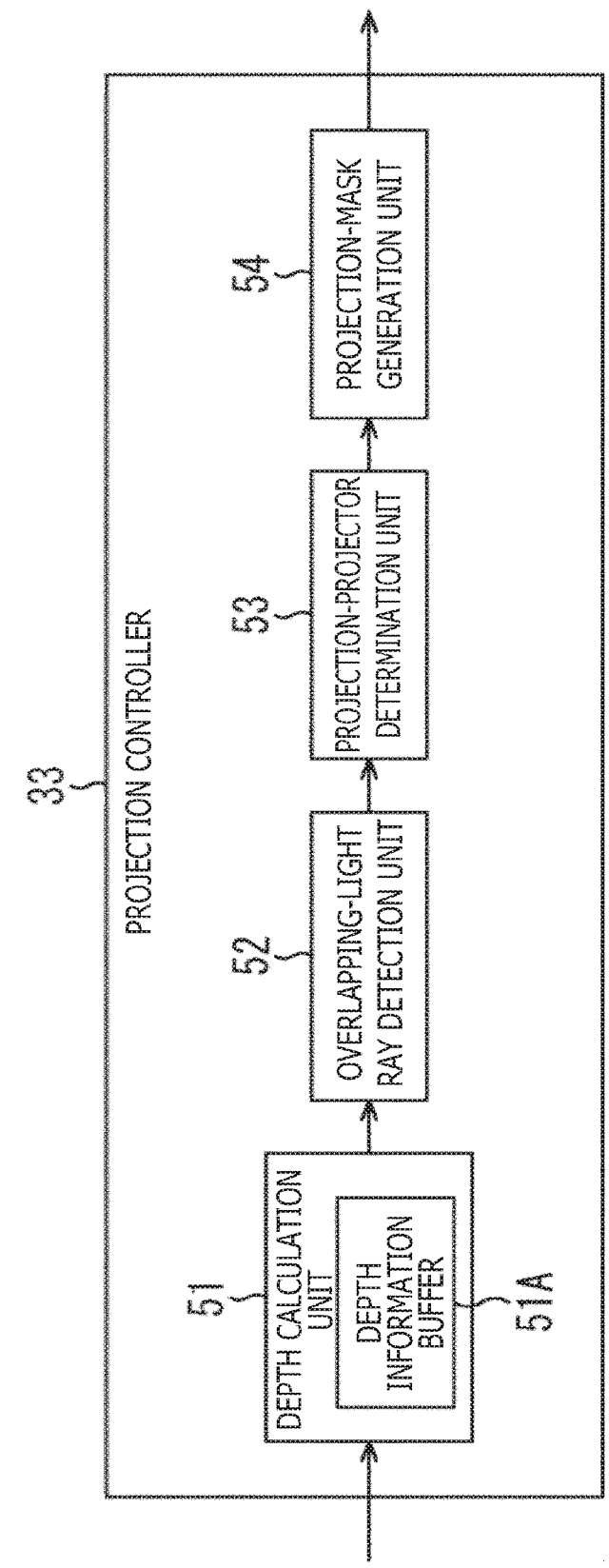
FIG. 3 depicts a block diagram illustrating an example of a configuration of a projection controller.

FIG. 3 is a block diagram illustrating an example of a configuration of the projection controller 33.

As depicted in FIG. 3, the projection controller 33 includes a depth calculation unit 51, an overlapping-light ray detection unit 52, a projection-projector determination unit 53, and a projection-mask generation unit 54. The internal parameters of each projector, the external parameters of each projector and the object, and the 3D model data are supplied to the depth calculation unit 51.

The depth calculation unit 51 calculates a depth (depth) from each projector, as a reference, to each position on the surface of the object of the projection target, on the basis of the information supplied from the outside, and then generates depth information that indicates the thus-calculated depths.

The depth calculation unit 51 causes a depth information buffer 51A to store the depth information. The depth information buffer 51A stores the depth information of each projector in the manner as follows: The depth information of the projector #0, the depth information of the projector #1, . . . , for example.

The overlapping-light ray detection unit 52 reads out and acquires the depth information of each projector from the depth information buffer 51A.

The overlapping-light ray detection unit 52 refers to the depth information, and determines whether or not, on the surface of the object, a light ray of a pixel of a projection image of a certain projector overlaps with a light ray from another projector. The overlapping-light ray detection unit 52 performs such a determination, i.e., the overlapping-light ray detection, paying attention to each pixel of each projector.

The projection-projector determination unit 53 specifies a position, on the surface of the object, at which a plurality of light rays overlaps with one another, on the basis of the determination result made by the overlapping-light ray detection unit 52. The projection-projector determination unit 53 determines how to irradiate the position on the surface of the object at which the plurality of the light rays overlaps with one another, that is, regarding which projector is used with a light ray of what intensity in percent.

For example, the projection-projector determination unit 53 determines each of the mask values of the light rays that overlap with one another, in a choice-between-two-values manner. That is, for example, the mask values are determined such that the irradiation is made with a light ray of an intensity of 100% from a certain projector and with a light ray of an intensity of 0% from the other projector. The mask value being 0% represents that no light ray is emitted from the pixel for which the mask value is set, that is, represents that black is projected.

In such a way, the projection mask is information that indicates which projector's light ray is used for irradiation, in the case where a predetermined position of the surface of an object is irradiated with light rays that are emitted from a plurality of the projectors and overlap with one another. The mask values corresponding to a position on the surface of the object that is irradiated with overlapping light rays, represent how to irradiate the position as follows: The position is irradiated with the light ray of the maximum intensity emitted from the projector for which the mask value of 100% is set, and is not irradiated from the projector for which the mask value of 0% is set.

The mask value may be adaptively controlled to a value other than the value chosen between the two values of 100% and 0%, so that, for example, the irradiation is done with a light ray of an intensity of 30% emitted from one projector and with a light ray of an intensity of 70% emitted from the other projector.

The projection-mask generation unit 54 generates a projection mask for each projector on the basis of the determination result made by the projection-projector determination unit 53. The projection masks generated the projection-mask generation unit 54 are supplied to the projection-image processing unit 32 and used for regulating the light rays.

The overlapping-light ray detection performed by the overlapping-light ray detection unit 52 and projector determination performed by the projection-projector determination unit 53 will be described in detail later.

Figure 4:
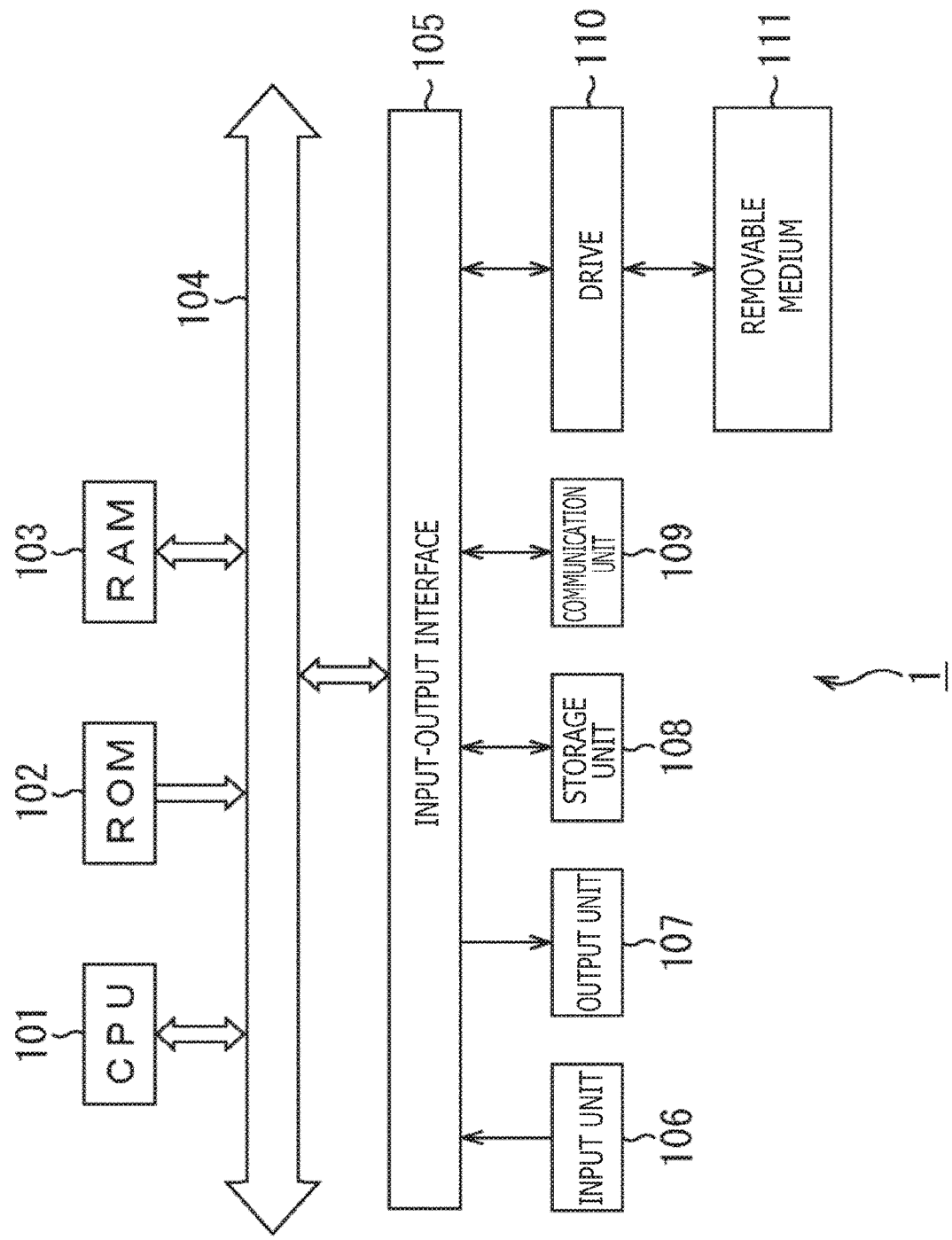
FIG. 4 depicts a block diagram illustrating an example of a hardware configuration of a control apparatus.

FIG. 4 is a block diagram illustrating an example of a hardware configuration of the control apparatus 1.

The control apparatus 1 includes a computer having a configuration as depicted in FIG. 4.

A CPU (Central Processing Unit) 101, a ROM (Read Only Memory) 102, and a RAM (Random Access Memory) 103 are coupled to each other by a bus 104.

To bus 104, an input-output interface 105 is further coupled. To the input-output interface 105, an input unit 106 including a keyboard and a mouse and an output unit 107 including a display and a speaker are coupled. In addition, to the input-output interface 105, a storage unit 108 including a hard disk and a non-volatile memory, a communication unit 109 including a network interface, and a drive 110 that drives a removable medium 111 are coupled.

At least a part of the functional units of the control apparatus 1 depicted in FIGS. 2 and 3 is implemented by executing a predetermined program with the CPU 101 of FIG. 4.

<Operation of Control Apparatus>

Here, operations of the control apparatus 1 with the aforementioned configuration will be described.

First, with reference to the flowchart depicted in FIG. 5, projection-mask generation processing of the projection controller 33 will be described.

In the following, for convenience of description, a case where two projectors, projector #0 and projector #1, are used will be described; however, similar processing is performed also in cases where more projectors are used.

In Step S1, the depth calculation unit 51 acquires both internal and external parameters of each projector which are input from the outside.

In Step S2, the depth calculation unit 51 acquires both 3D model data and external parameters of the object of a projection target which are input from the outside.

In Step S3, the depth calculation unit 51 estimates a relation between relative postures of each projector and the object, on the basis of both the external parameters of each projector and the external parameters of the object of the projection target. Moreover, the depth calculation unit 51 calculates a depth from the projector, as a reference, to each position on the surface of the object of the projection target, of the basis of the estimated relation between the postures and other information. The depth information that indicates the depths calculated by the depth calculation unit 51 is stored in the depth information buffer 51A.

In Step S4, the overlapping-light ray detection unit 52 acquires the depth information of each projector by reading it out from the depth information buffer 51A.

In Step S5, the overlapping-light ray detection unit 52 pays attention to one projector.

In Step S6, the overlapping-light ray detection unit 52 pays attention to one pixel of a projected image of the attention-receiving projector. For example, the pixels receive the attention in the order from the pixel at the upper left end.

In Step S7, the overlapping-light ray detection unit 52 performs overlapping-light ray detection processing. The overlapping-light ray detection processing is for determining whether or not, on the surface of the object, the light ray of the attention-receiving pixel overlaps with a light ray from another projector.

Here, with reference to the flowchart of FIG. 6, the overlapping-light ray detection processing performed in Step S7 of FIG. 5 will be described.

In Step S31, the overlapping-light ray detection unit 52 traces the light ray of the attention-receiving pixel.

In Step S32, the overlapping-light ray detection unit 52 determines whether or not the light ray of the attention-receiving pixel impinges on the surface of the object of the projection target. This determination is performed by referring to the depth information of the attention-receiving projector.

In the case where it is determined, in Step S32, that the light ray of the attention-receiving pixel impinges on the surface of the object of the projection target, the overlapping-light ray detection unit 52 transforms, in Step S33, the impingement point $P_0$ to a point $P'_0$ in the coordinate system of another projector, the impingement point $P_0$ being the point on the surface of the object on which the light ray of the attention-receiving pixel impinges.

In a case where the projector #0 is receiving attention, the impingement point $P_0$ is then the point in the coordinate system with the projector #0 as a reference, and the point $P'_0$ is then the point in the coordinate system with the projector #1 as a reference.

In Step S34, the overlapping-light ray detection unit 52 performs backward ray tracing for the point $P'_0$, thereby calculating a point $P_1$ with the projector #1 as a reference, with the point $P_1$ corresponding to the impingement point $P_0$. The backward ray tracing for the point $P'_0$ is performed with reference to the depth information of the projector #1.

In Step S35, the overlapping-light ray detection unit 52 determines whether or not the point $P'_0$ and the point $P_1$ are an identical point in the three-dimensional space.

In the case where it is determined, in Step S35, that the point $P'_0$ and the point $P_1$ are an identical point, the overlapping-light ray detection unit 52 then determines, in Step S36, that the light ray, with which the impingement point Pa is irradiated, from the attention-receiving pixel is an overlapping light ray.

Figure 7:
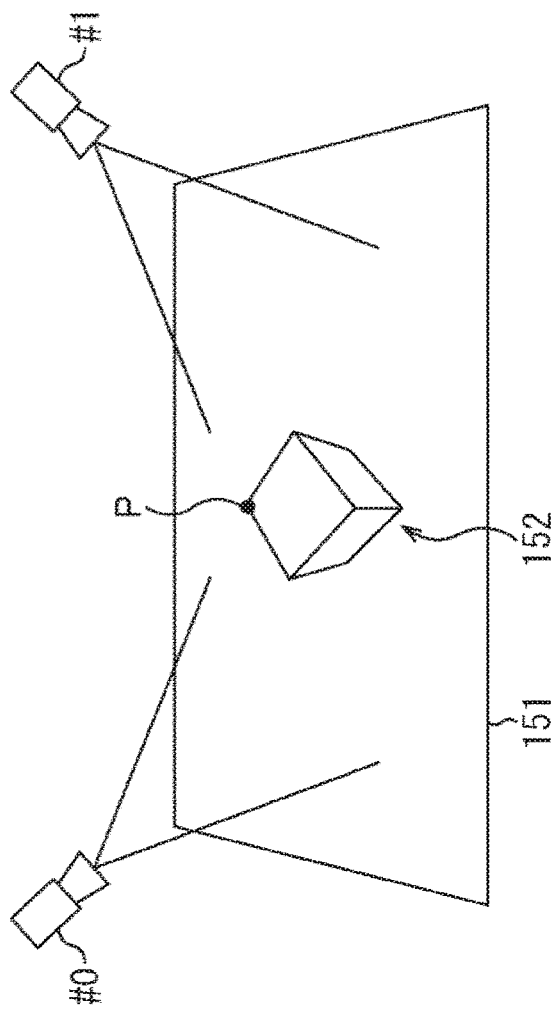
FIG. 7 depicts a diagram illustrating an example of overlapping-light ray detection.

FIG. 7 is a diagram illustrating an example of overlapping-light ray detection.

In the example of FIG. 7, the substantially cubic object 152 on the floor surface 151 is illustrated as the object of a projection target.

The shape of the object 152 is specified on the basis of the 3D model data. Moreover, a relation between the postures of the projector #0 and the object 152 is estimated on the basis of the external parameters of the projector #0 and the object 152. Similarly, a relation between the postures of the projector #1 and the object 152 is estimated on the basis of the external parameters of the projector #1 and the object 152.

For example, in the case where the projector #0 is receiving attention and the light ray of a predetermined pixel of the projected image of the projector #0 impinges on the point P at a corner of the upper surface of the object 152, it is determined whether or not the point P is irradiated with a light ray from the projector #1.

FIG. 8 depicts diagrams illustrating an example of depth information.

Diagram A of FIG. 8 represents depth information of the projector #0, and diagram B of FIG. 8 represents depth information of the projector #1.

In diagram A of FIG. 8, the coloration of the cube representing the object 152 indicates that, with the projector #0 as a reference, the object 152 is positioned closer to the reference than the floor surface 151 is. The black circle at the upper left corresponds to the point P in FIG. 7

The point P is represented as the impingement point $P_0$ in the coordinate system with the projector #0 as a reference. The impingement point $P_0$ is transformed to a point $P_0$ in the coordinate system with the projector #1 as a reference. The coordinate system transformation is performed using, for example, parameters calculated on the basis of the relation between the postures of each of the projectors #0 and #1 and the object 152.

By performing the backward ray tracing for the point $P'_0$, the point $P_1$ with the projector #1 as a reference is calculated; the thus-calculated point is one corresponding to the impingement point $P_0$. In diagram B of FIG. 8, the coloration of the cube representing the object 152 indicates that, with the projector #1 as a reference, the object 152 is positioned closer to the reference than the floor surface 151 is. The upper black circle corresponds to the point $P_1$.

In the case where the point $P'_0$ and the point $P_1$ are an identical point in the three-dimensional space, it is determined that the light ray of the attention-receiving pixel, i.e., the light ray from the projector #0 with which the point P in FIG. 7 is irradiated, is an overlapping light ray.

Figure 5:
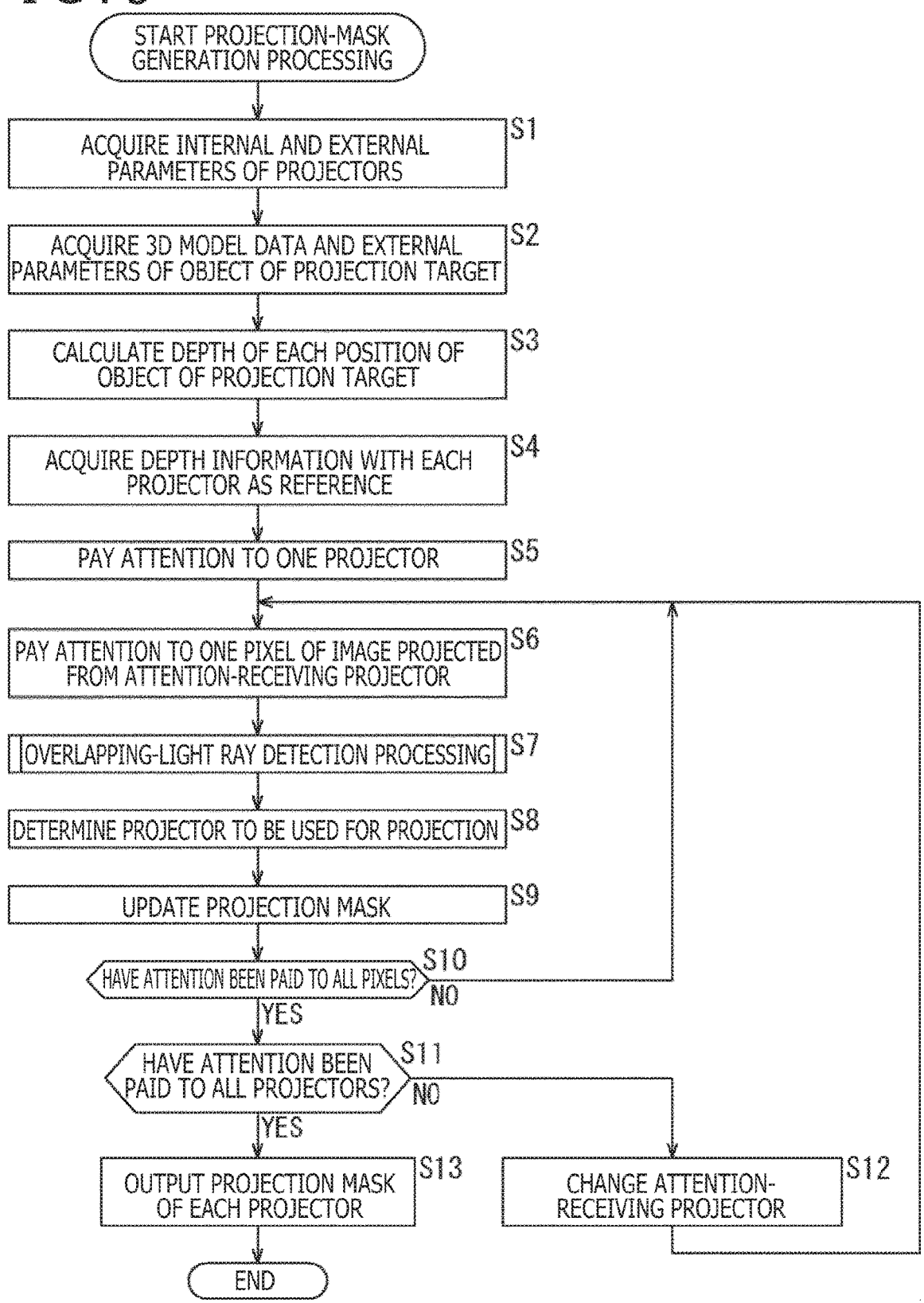
FIG. 5 depicts a flowchart illustrating projection-mask generation processing of the projection controller.
Figure 6:
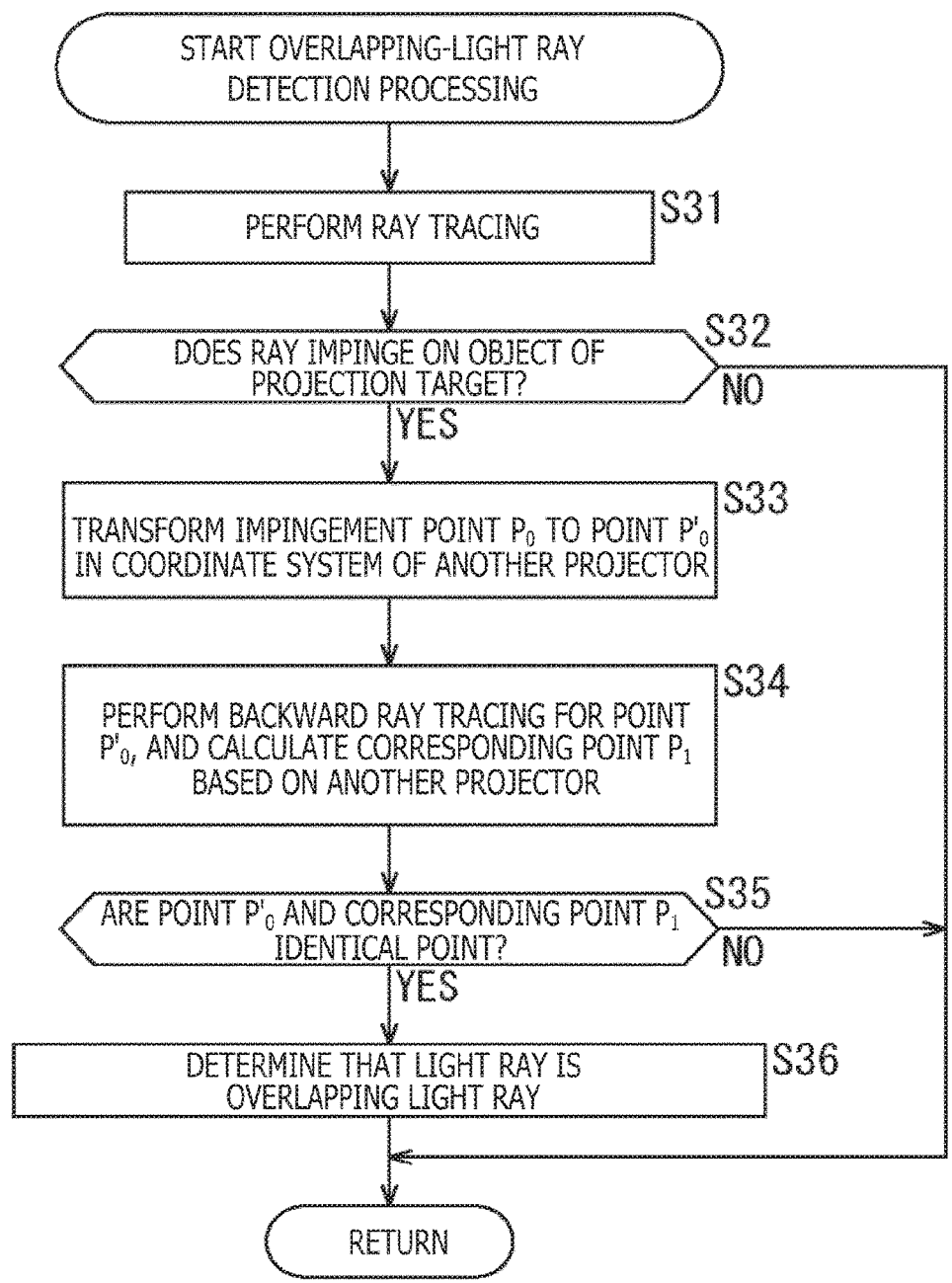
FIG. 6 depicts a flowchart illustrating overlapping-light say detection processing that is performed in Step S7 of FIG. 5.

After it is determined in such a way in Step S35 that the light ray of the attention-receiving pixel is the overlapping light ray, the process returns to Step S7 in FIG. 5 and the subsequent processing is performed.

Likewise, is cases where either it is determined in Step S32 that the light ray of the attention-receiving pixel does not impinge on the surface of the object of the projection target or it is determined in Step S35 that the point $P'_0$ and the point $P_1$ are not any identical point, the process returns to Step S7 in FIG. 5 and the subsequent processing is performed. In either case, the determination indicates that the light ray of the attention receiving pixel is not an overlapping light ray.

Returning to the description of FIG. 5, in Step S8, the projection-projector determination unit 53 determines the projector that is to irradiate the position, on the surface of the object, which would be irradiated with the light ray of the attention-receiving pixel, on the basis of the result of the overlapping-light ray detection processing.

For example, in the case where it is determined that the light ray of the attention-receiving pixel is not an overlapping light ray, the projection-projector determination unit 53 determines the attention-receiving projector as the projector to irradiate the position, or the surface of the object, which is to be irradiated with the light ray of the attention-receiving pixel.

On the other hand, in the case where it is determined that the light ray of the attention-receiving pixel is an overlapping light ray, the projection-projector determination unit 53 determines one of the projector #0 and the projector #1 as the projector to irradiate the position, on the surface of the object, which would be irradiated with the overlapping light ray.

Specifically, the projection-projector determination unit 53 calculates both the incident angle of the light ray from the projector #0 to the object and the incident angle of the light ray from the projector #1 to the object, then determines the projector that emits the light ray having the smaller of the incident angles. In cases where light rays from three or more projectors overlap with one another, the projector that provides the smallest of their incident angles is determined.

Figure 9:
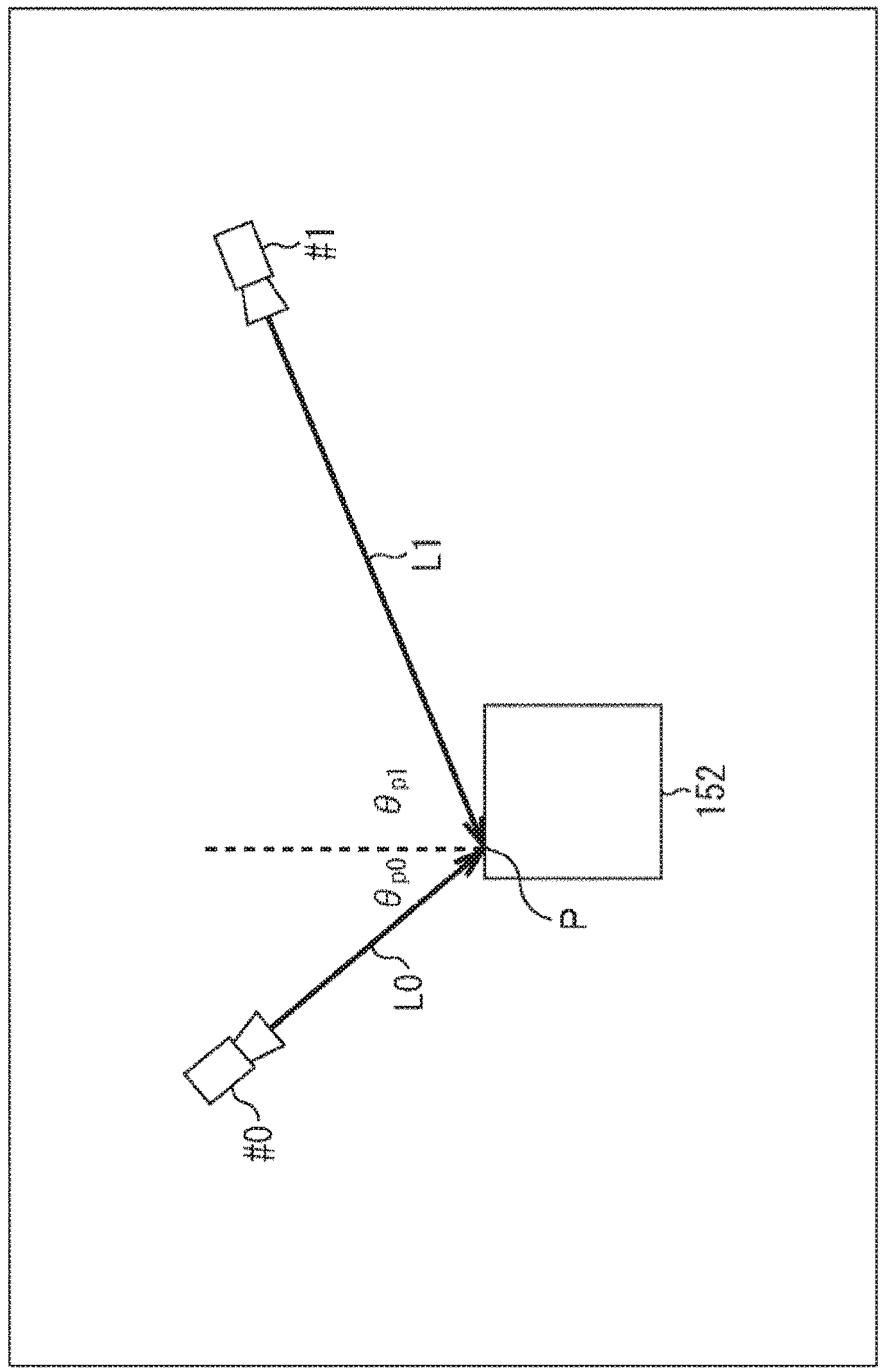
FIG. 9 depicts a diagram as example of how a projector is determined.

FIG. 9 is a diagram an example of how a projector is determined.

For example, in a case where a point P is irradiated with both a light ray from the projector #0 indicated by a straight arrow L0 and a light ray from the projector #1 indicated by the straight arrow L1, with the light rays overlapping with each other, there are determined both an incident angle $\theta_{p0}$ of the light ray from the projector #0 and an incident angle $\theta_{p1}$ of the light ray from the projector #1. In the case of FIG. 9, the incident angle $\theta_{p0}$ is smaller than the incident angle $\theta_{p1}$. In this case, the projector #0 is determined as the projector to be used for the irradiation of the point P.

Information regarding the projectors determined in such a way is supplied from the projection-projector determination unit 53 to the projection-mask generation unit 54.

In Step S9 of FIG. 5, the projection-mask generation unit 54 updates the projection mask of each projector by reflecting the determination made by the projection-projector determination unit 53.

For example, in the case where the projector is determined as illustrated in FIG. 9, a value of 100% is set for the mask value of the attention-receiving pixel in the projection mask of the projector #0. In addition, in the projection mask of the projector #1, a value of 0% is set for the mask value of the pixel corresponding to the point P (i.e., the pixel irradiating the point P with its light ray).

In Step S10 of FIG. 5, the overlapping-light ray detection unit 52 determines whether or not attention has been paid to all the pixels that constitute the projection image of the attention-receiving projector. In a case where it is determined in Step S10 that attention has been paid to not all the pixels yet, the process returns to Step S6, the attention-receiving pixel is changed and the above processing is repeated.

On the other hand, in a case where it is determined in Step S10 that attention has been paid to all the pixels which constitute the projection image of the attention-receiving projector, the overlapping-light ray detection unit 52 determines, in Step S11, whether or not attention has been paid to all the projectors.

In a case where it is determined in Step S11 that attention has been paid to not all the projectors yet, the overlapping-light ray detection unit 52 changes, in Step S12, the attention-receiving projector to another one. After that, the process returns to Step S6, and the similar processing is repeated.

In a case where it is determined in Step S11 that attention has been paid to all the projectors, the projection-mask generation unit 54 outputs, in Step S13, the projection masks of the respective projectors, and ends the processing. The projection masks output from the projection-mask generation unit 54 are used by the projection-image processing unit 32 to regulate the light rays emitted from the respective projectors.

Next, with reference to the flowchart illustrated in FIG. 10, projection processing by the projection-image processing unit 32 will be described.

Figure 10:
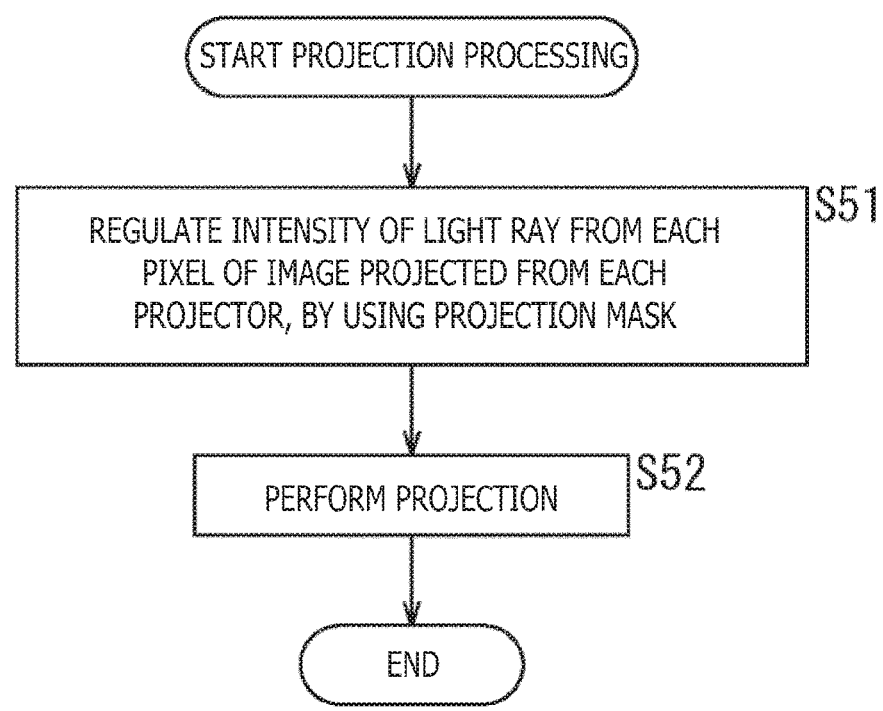
FIG. 10 depicts a flowchart illustrating projection processing that is performed by a projection image processing unit.

The processing illustrated in FIG. 10 is performed after the projection masks have been generated by performing the processing described above. To the projection-image processing unit 32, data of the projected image of each projector are input.

In Step S51, the projection-image processing unit 32 regulates the intensity of the light ray of each pixel of the projection image of each projector, through use of the projection mask of the projector.

For example, in the case where the projector #0 is determined as the projector that emits a light ray to the point P in the manner as described with reference to FIG. 9, the light ray from the projector #0 is regulated to have an intensity of 100%, on the basis of the projection mask of the projector #0. In addition, the light ray from the projector #1 for the irradiation of the point P is regulated to have an intensity of 0%, on the basis of the projection mask of the projector #1.

In Step S52, the projection-image processing unit 32 controls the respective projectors so as to cause them to project their projection images by using the light rays of the regulated intensities.

The above processing is repeated while the projection image is being projected. When the projection of the projection image is finished, the processing illustrated in FIG. 10 ends.

Figure 11:
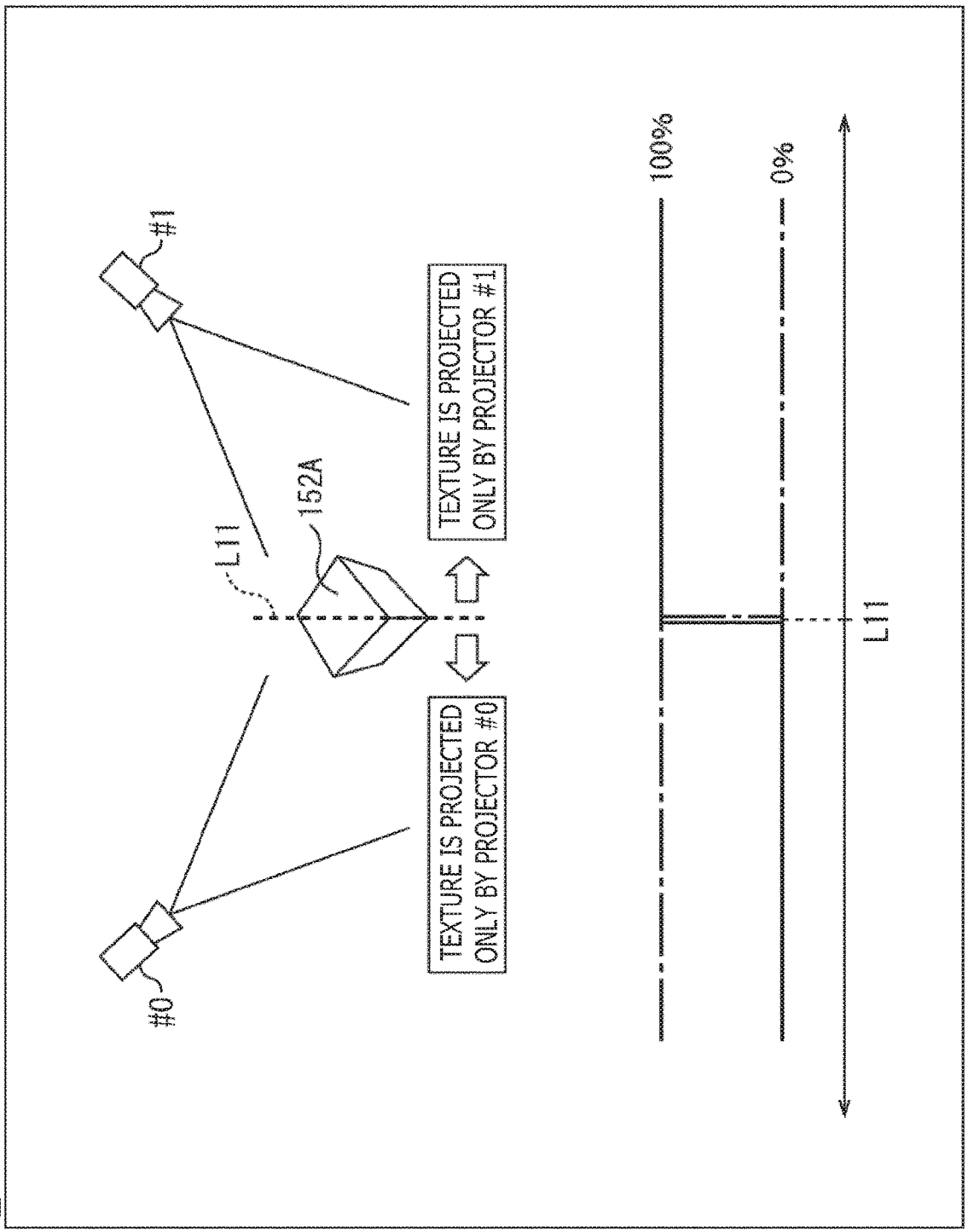
FIG. 11 depicts a diagram illustrating an example of projection using projection masks.

FIG. 11 is a diagram illustrating an example of projection using projection masks.

Suppose, for example, the whole of the upper surface 1522 of an object 152 is an overlapping area where the projection range of the projector #0 overlaps with the projection range of the projector #1. The corresponding light ray emitted from the projector #0 to each irradiation position of the upper surface 152A and the corresponding light ray emitted from the projector #1 to the irradiation position of the upper surface 152A, are then overlapping light rays.

In this case, of the mask values of the projection mask of the projector #0, the mask values of the pixels for irradiating, with light rays, the left side of the upper surface 152A indicated by using a broken line L11 are set to 100%, and the mask values of the pixels for irradiating, with light rays, the right side of the upper surface 152A are set to 0%.

By regulating the intensity of the light ray of each pixel of the projection image of the projector #0, on the basis of such a projection mask, the left side of the upper surface 152A is then irradiated with light rays only from the projector #0, as illustrated by a dot-and-dash line in the lower part of FIG. 11. A texture on the left side of the upper surface 152A is represented by the image projected by the projector #0.

In the graph illustrated in the lower part of FIG. 11, the horizontal axis represents the position on the upper surface 152A, and the vertical axis represents the mask value (intensity of the light ray).

On the other hand, of the mask values of the projection mask of the projector #1, the mask values of the pixels for irradiating, with light rays, the right side of the upper surface 152A indicated by using the broken line L11 are set to 100%, and the mask values of the pixels for irradiating, with light rays, the left side of the upper surface 152A are set to 0%.

By regulating the intensity of the light ray of each pixel of the projection image of the projector #1, on the basis of such a projection mask, the right side of the upper surface 152A is then irradiated with light rays only from the projector #1, as illustrated by a solid line in the lower part of FIG. 11. A texture on the right side of the upper surface 152A is represented by the image projected by the projector #1.

As described above, the overlapping area is detected and the projection of the image in the overlapping area is performed with, for example, one projector. This allows a reduction of deterioration in resolution of texture images on the surface of an object. Further, this allows an increase in uniformity of brightness.

Figure 12:
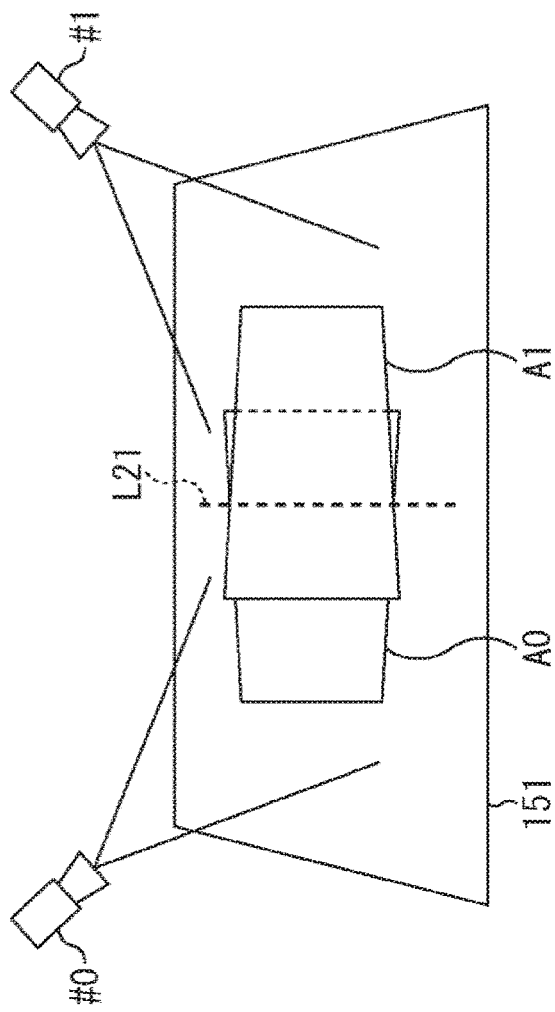
FIG. 12 depicts a diagram illustrating an example in which images are projected on a plane.

With the assumption that, in a case where images are projected on a plane as depicted in FIG. 12, both the projection region of projector #0 and the projection region of projector #1 can be specified, it will make possible the setting of a boundary at the intermediate position represented by the broken line L21, and make possible the easy setting of such binary mask values as described above. Since the projection target for the image is a three-dimensional object, it is necessary to perform ray tracing, determine whether or not the light ray of each pixel will impinge on the surface of the object, and any other issues.

In FIG. 12, an area A0 represented as a trapezoidal shape is the projection region of the projector #0, and an area A1 is the projection region of the projector #1.

<Modifications>

In order to make the switching of the projector projecting an image less conspicuous, the projection onto such an overlapping area may be performed using two projectors.

In this case, the mask values for the overlapping area onto which the two projectors project images via superimposition are set such that they each vary as a continuous value, for example, in the range of 0% to 100%.

Figure 13:
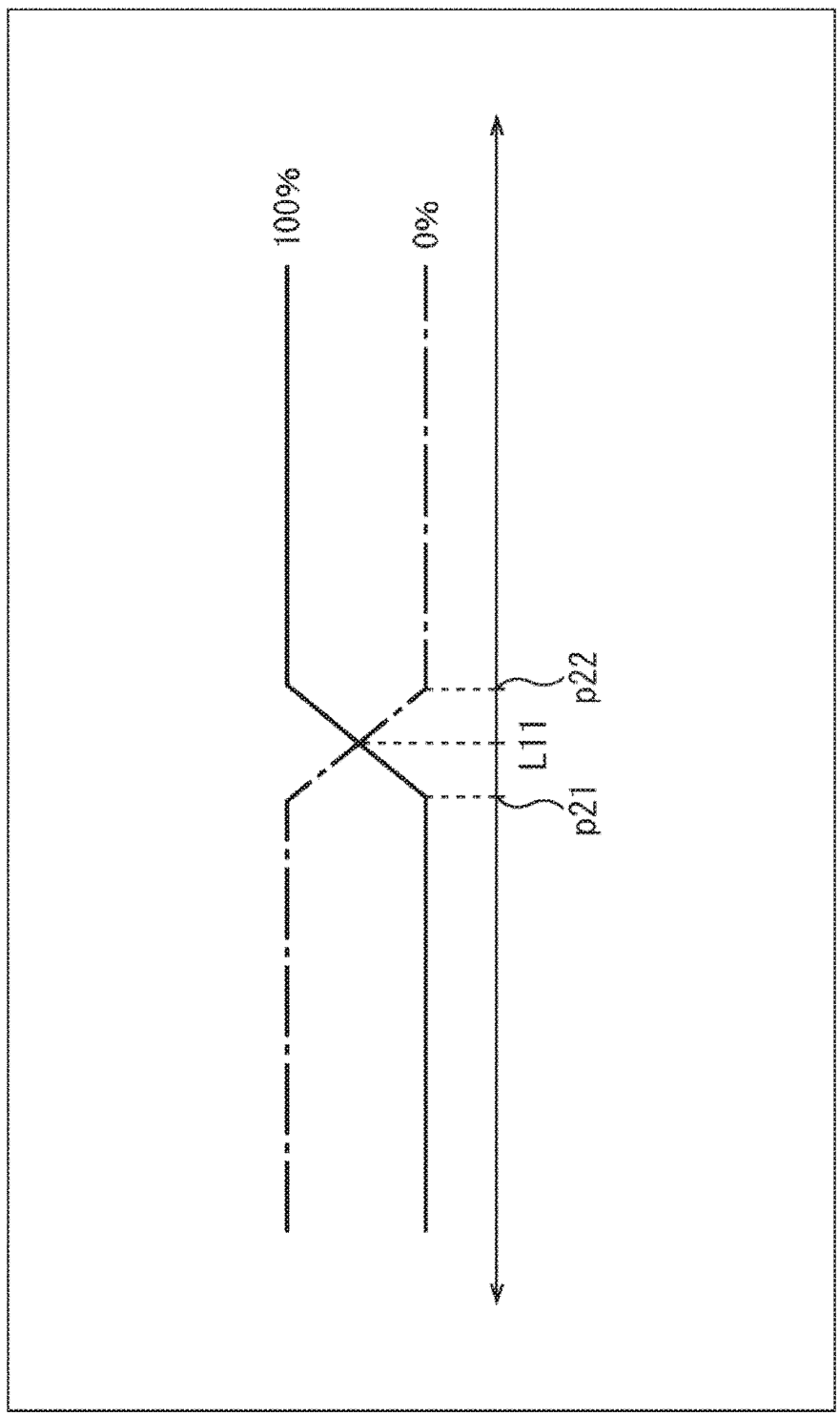
FIG. 13 depicts a graph illustrating an example of mask values in an overlapping area.

FIG. 13 is a graph illustrating an example of mask values in an overlapping area.

In the example of FIG. 13, an area between a position p21 and a position p22, sandwiching the position of the broken line L11 of FIG. 11, is set as the overlapping area.

The mask value of projector #0 corresponding to the overlapping area is set so as to gradually decrease from 100% to 0% at a greater distance away from the position p21 to the position p22. Moreover, the mask value of projector #1 corresponding to the overlapping area is set so as to gradually decrease from 100% to 0% at a greater distance away from the position p22 to the position p21.

Although it has been described that the overlapping area is detected via the processing by software, the overlapping area may be detected as follows: In the actual space, the images projected by the respective projectors are captured with a camera, and then the overlapping area is detected on the basis of the thus-captured image.

Although it has been described that the control apparatus 1 is prepared as an apparatus which is housed in another casing separately from the projectors, the aforementioned functions of the control apparatus 1 may be provided is any of a plurality of the projectors.

Although it has been described that the control apparatus 1 is coupled to every of a plurality of the projectors via wired or wireless communication, they may be coupled via the Internet.

The series of items of the processing described above can be executed by hardware or software. In cases where the series of items of the processing is executed by software, a program constituting the software is installed in a computer incorporated in dedicated hardware, a general-purpose personal computer, or any other apparatus.

The installed program is provided by being recorded in the removable medium 111 depicted in FIG. 4 that includes an optical disc (CD-ROM (Compact Disc-Read Only Memory), DVD (Digital Versatile Disc), etc.), and a semiconductor memory. Moreover, the program may be provided via a wired or wireless transmission medium such as a local area network, the Internet, or digital broadcasting. The program can be installed in advance in the ROM 102 or the storage unit 108.

Note that, the program executed by a computer may be a program in which the steps of processing are performed in time series in the order described in the present specification, or may be a program in which the steps of processing are performed in parallel or at necessary timing such as when a call is made.

In the specification, the system refers to an aggregation of a plurality of constituent elements (apparatuses, modules (components), etc.), and whether or not all the constituent elements are provided within an identical casing is irrelevant. Therefore, a plurality of apparatuses that are accommodated in different casings and connected via a network and a single apparatus in which a plurality of modules is accommodated in a single casing are both referred to as system.

The embodiment of the present technology is not limited to the embodiment described above, and various modifications can be made without deviating from the of the present technology.

For example, the present technology can take a cloud computing configuration in which one function is divided and processed in cooperation by a plurality of apparatuses via a network.

Moreover, each of the steps illustrated in the flowcharts described above can be executed by a single apparatus or can be divided and executed by a plurality of apparatuses.

Furthermore, in a case where a plurality of processing items is included in a single step, the plurality of the processing items included in that single step can be executed by a single apparatus or can be divided and executed by a plurality of apparatuses.

Note that the effect described in the present specification is illustrative only, there is no limitation to the effect, and another effect may be present.

Exemplary Combinations of Configurations

The present technology may also employ the following configurations.

(1)

An information processing apparatus including:

a generation unit configured to generate, in regard to a plurality of projectors configured to irradiate an object serving as a projection target with projection light rays as superimposing light rays depicting a projection image having pixels, mask information used for regulating an intensity of the corresponding light ray of each pixel of the projection image, the mask information including information indicating, in regard to the object having a surface including a predetermined position, that the predetermined position is irradiated by a predetermined projector of the projectors.

(2)

The information processing apparatus according to (1), in which the generation unit generates the mask information including information indicating that the predetermined position is irradiated by one projector of the projectors.

(3)

The information processing apparatus according to (2), further including:

a determination unit configured to determine, as the one projector irradiating the predetermined position, one projector of the projectors on the basis of an angle at which each of the projectors irradiates the predetermined position with the corresponding light ray.

(4)

The information processing apparatus according to (3), in which, of a plurality of the projectors each irradiating the predetermined position with the corresponding light ray at an incident angle, the determination unit determines, as the one projector irradiating the predetermined position, the projector irradiating the predetermined position with the corresponding light ray at a smallest incident angle relative to the predetermined position.

(5)

The information processing apparatus according to (3) or (4), in which, as the mask information for the projector irradiating the predetermined position, the generation unit generates the mask information including information indicating that the predetermined position is irradiated at a maximum intensity, and, as the mask information for the projector not irradiating the predetermined position, the generation unit generates the mask information including information indicating that the projector does not irradiate the predetermined position.

(6)

The information processing apparatus according to any one of (1) to (5), further including:

a detection unit configured to detect the superimposing light rays by performing ray tracing of the projection light rays of a plurality of the projectors.

(7)

The information processing apparatus according to (6), in which the detection unit detects the superimposing light rays, on the basis of an internal parameter of a plurality of the projectors, information regarding postures of the projectors and the object, and model data of the object.

(8)

An information processing method performed by an information processing apparatus, the method including:

generating, in regard to a plurality of projectors configured to irradiate an object serving as a projection target with projection light rays as superimposing light rays depicting a projection image having pixels, mask information used for regulating an intensity of the corresponding light ray of each pixel of the projection image, the mask information including information indicating, in regard to the object having a surface including a predetermined position, that the predetermined position is irradiated by a predetermined projector of the projectors.

(9)

A program for causing a computer to execute processing of:

generating, is regard to a plurality of projectors configured to irradiate an object serving as a projection target with projection light rays as superimposing light rays depicting a projection image having pixels, mask information used for regulating an intensity of the corresponding light ray of each pixel of the projection image, the mask information including information indicating, in regard to the object having a surface including a predetermined position, that the predetermined position is irradiated by a predetermined projector of the projectors.

(10)

An information processing apparatus including:

a projection processing unit configured to regulate, in regard to a plurality of projectors configured to irradiate an object serving as a projection target with projection light rays as superimposing light rays depicting a projection image having pixels, an intensity of the corresponding light ray of each pixel of the projection image of each of the projectors, on the basis of mask information generated including information that indicates, in regard to the object having a surface including a predetermined position, that the predetermined position is irradiated by a predetermined projector of the projectors, and cause each of the projectors to project the projection image.

(11)

An information processing method performed by an information processing apparatus, the method including:

regulating, in regard to a plurality of projectors configured to irradiate an object serving as a projection target with projection light rays as superimposing light rays depicting a projection image having pixels, an intensity of the corresponding light ray of each pixel of the projection image of each of the projectors, on the basis of mask information generated including information that indicates, in regard to the object having a surface including a predetermined position, that the predetermined position is irradiated by a predetermined projector of the projectors; and causing each of the projectors to project the projection image.

(12)

A program for causing a computer to execute processing of:

regulating, in regard to a plurality of projectors configured to irradiate an object serving as a projection target with projection light rays as superimposing light rays depicting a projection image having pixels, an intensity of the corresponding light ray of each pixel of the projection image of each of the projectors, on the basis of mask information generated including information that indicates, in regard to the object having a surface including a predetermined position, that the predetermined position is irradiated by a predetermined projector of the projectors; and causing each of the projectors to project the projection image.

REFERENCE SIGNS LIST

1 Control apparatus, 31 Captured-image processing unit, 32 Projection-image processing unit, 33 Projection controller, 51 Depth calculation unit, 52 Overlapping-light ray detection unit, 53 Projection-projector determination unit, 54 Projection-mask generation unit

The invention claimed is:

1. An information processing apparatus comprising:
a generation unit configured to generate, in regard to a plurality of projectors configured to irradiate an object serving as a projection target with projection light rays as superimposing light rays depicting a projection image having pixels, mask information used for regulating an intensity of a corresponding light ray of each pixel of the projection image, the mask information including information indicating, in regard to the object having a surface including a predetermined position, that the predetermined position is irradiated by a predetermined projector of the projectors,
wherein the mask information is generated based on transforming an impingement point of a light ray irradiated by the predetermined projector in a coordinate system of the predetermined projector to a point in a coordinate system of another projector of the projectors, and
wherein the generation unit is implemented via at least one processor.

2. The information processing apparatus according to claim 1, wherein
the generation unit is further configured to generate the mask information including information indicating that the predetermined position is irradiated by one projector of the projectors.

3. The information processing apparatus according to claim 2, further comprising:
a determination unit configured to determine, as the one projector irradiating the predetermined position, one projector of the projectors on a basis of an angle at which each of the projectors irradiates the predetermined position with the corresponding light ray,
wherein the determination unit is implemented via at least one processor.

4. The information processing apparatus according to claim 3, wherein,
of a plurality of the projectors each irradiating the predetermined position with the corresponding light ray at an incident angle, the determination unit is further configured to determine, as the one projector irradiating the predetermined position, the projector irradiating the predetermined position with the corresponding light ray at a smallest incident angle relative to the predetermined position.

5. The information processing apparatus according to claim 3, wherein,
as the mask information for the projector irradiating the predetermined position, the generation unit is further configured to generate the mask information including information indicating that the predetermined position is irradiated at a maximum intensity, and,
as the mask information for the projector not irradiating the predetermined position, the generation unit is further configured to generate the mask information including information indicating that the projector does not irradiate the predetermined position.

6. The information processing apparatus according to claim 1, further comprising:
a detection unit configured to detect the superimposing light rays by performing ray tracing of the projection light rays of a plurality of the projectors,
wherein the detection unit is implemented via at least one processor.

7. The information processing apparatus according to claim 6, wherein
the detection unit is further configured to detect the superimposing light rays, on a basis of an internal parameter of a plurality of the projectors, information regarding postures of the projectors and the object, and model data of the object.

8. The information processing apparatus according to claim 1, wherein the mask information is further generated based on performing backward ray tracing for the point in the coordinate system of the another projector with reference to depth information of the another projector.

9. An information processing method performed by an information processing apparatus, the method comprising:
generating, in regard to a plurality of projectors configured to irradiate an object serving as a projection target with projection light rays as superimposing light rays depicting a projection image having pixels, mask information used for regulating an intensity of a corresponding light ray of each pixel of the projection image, the mask information including information indicating, in regard to the object having a surface including a predetermined position, that the predetermined position is irradiated by a predetermined projector of the projectors,
wherein the mask information is generated based on transforming an impingement point of a light ray irradiated by the predetermined projector in a coordinate system of the predetermined projector to a point in a coordinate system of another projector of the projectors.

10. A non-transitory computer-readable medium having embodied thereon a program, which when executed by a computer causes the computer to execute an information processing method, the method comprising:
generating, in regard to a plurality of projectors configured to irradiate an object serving as a projection target with projection light rays as superimposing light rays depicting a projection image having pixels, mask information used for regulating an intensity of a corresponding light ray of each pixel of the projection image, the mask information including information indicating, in regard to the object having a surface including a predetermined position, that the predetermined position is irradiated by a predetermined projector of the projectors,
wherein the mask information is generated based on transforming an impingement point of a light ray irradiated by the predetermined projector in a coordinate system of the predetermined projector to a point in a coordinate system of another projector of the projectors.

11. An information processing apparatus comprising:
a projection processing unit configured to
regulate, in regard to a plurality of projectors configured to irradiate an object serving as a projection target with projection light rays as superimposing light rays depicting a projection image having pixels, an intensity of a corresponding light ray of each pixel of the projection image of each of the projectors, on a basis of mask information generated including information that indicates, in regard to the object having a surface including a predetermined position, that the predetermined position is irradiated by a predetermined projector of the projectors, and cause each of the projectors to project the projection image, wherein the mask information is generated based on transforming an impingement point of a light ray irradiated by the predetermined projector in a coordinate system of the predetermined projector to a point in a coordinate system of another projector of the projectors, and wherein the projection processing unit is implemented via at least one processor.

12. An information processing method performed by an information processing apparatus, the method comprising:

regulating, in regard to a plurality of projectors configured to irradiate an object serving as a projection target with projection light rays as superimposing light rays depicting a projection image having pixels, an intensity of a corresponding light ray of each pixel of the projection image of each of the projectors, on a basis of mask information generated including information that indicates, in regard to the object having a surface including a predetermined position, that the predetermined position is irradiated by a predetermined projector of the projectors; and causing each of the projectors to project the projection image, wherein the mask information is generated based on transforming an impingement point of a light ray irradiated by the predetermined projector in a coordinate system of the predetermined projector to a point in a coordinate system of another projector of the projectors.

13. A non-transitory computer-readable medium having embodied thereon a program, which when executed by a computer causes the computer to execute an information processing method, the method comprising:

regulating, in regard to a plurality of projectors configured to irradiate an object serving as a projection target with projection light rays as superimposing light rays depicting a projection image having pixels, an intensity of a corresponding light ray of each pixel of the projection image of each of the projectors, on a basis of mask information generated including information that indicates, in regard to the object having a surface including a predetermined position, that the predetermined position is irradiated by a predetermined projector of the projectors; and causing each of the projectors to project the projection image, wherein the mask information is generated based on transforming an impingement point of a light ray irradiated by the predetermined projector in a coordinate system of the predetermined projector to a point in a coordinate system of another projector of the projectors.

* * * * *